(12) United States Patent
Itagaki et al.

(10) Patent No.: US 10,439,424 B2
(45) Date of Patent: Oct. 8, 2019

(54) NON-CONTACT POWER SUPPLY DEVICE AND NON-CONTACT POWER TRANSMISSION DEVICE

(71) Applicants: TDK Corporation, Tokyo (JP); TDK TAIWAN Corporation, Taipei (TW)

(72) Inventors: Kazuya Itagaki, Tokyo (JP); Shinji Higuma, Tokyo (JP); Tsutomu Fukai, Taipei (TW)

(73) Assignees: TDK Corporation, Tokyo (JP); TDK TAIWAN Corporation, Taipei (TW)

( * ) Notice: Subject to any disclaimer, the term of this patent is extended or adjusted under 35 U.S.C. 154(b) by 0 days.

(21) Appl. No.: 15/755,613

(22) PCT Filed: Aug. 28, 2015

(86) PCT No.: PCT/JP2015/074541
§ 371 (c)(1),
(2) Date: Feb. 27, 2018

(87) PCT Pub. No.: WO2017/037811
PCT Pub. Date: Mar. 9, 2017

(65) Prior Publication Data
US 2019/0081496 A1  Mar. 14, 2019

(51) Int. Cl.
*H02J 50/10* (2016.01)
*H02J 7/02* (2016.01)
(Continued)

(52) U.S. Cl.
CPC .............. *H02J 7/025* (2013.01); *H01F 38/14* (2013.01); *H02J 7/0042* (2013.01); *H02J 50/10* (2016.02)

(58) Field of Classification Search
USPC ....................................................... 320/108
See application file for complete search history.

(56) References Cited

U.S. PATENT DOCUMENTS

2004/0227619 A1    11/2004  Watanabe
2007/0046256 A1*   3/2007   Kim .................. H02J 5/005
                                              320/109
(Continued)

FOREIGN PATENT DOCUMENTS

JP    2000-217279 A    8/2000
JP    2003-079075 A    3/2003
(Continued)

OTHER PUBLICATIONS

International Search Report of International Application No. PCT/JP2015/074541, dated Oct. 6, 2015.

*Primary Examiner* — Robert Grant
(74) *Attorney, Agent, or Firm* — Leydig, Voit & Mayer, Ltd.

(57) ABSTRACT

A non-contact power supply device on which a power-feeding object device can easily and appropriately be placed, and a non-contact power transmission device including the power-feeding object device. The non-contact power transmission device includes a non-contact power supply device having a power feeding coil, a housing that houses the power feeding coil, and a bobbin around which the power feeding coil is wound. The housing has a concave part at least partially accommodating a power-feeding object device. The concave part has a curved surface at least in a portion of an inner surface on which the power-feeding object device is placed. The curved inner surface of the concave part prevents the power-feeding object device from standing upright. A portable electronic device serving as the power-feeding object device is at least partially accommodated in the concave part.

24 Claims, 9 Drawing Sheets

(51) Int. Cl.
*H02J 7/00* (2006.01)
*H01F 38/14* (2006.01)

(56) References Cited

U.S. PATENT DOCUMENTS

| | | | |
|---|---|---|---|
| 2014/0091756 A1* | 4/2014 | Ofstein | H02J 5/005 320/108 |
| 2015/0102773 A1* | 4/2015 | Song | H02J 7/0042 320/108 |
| 2015/0188339 A1* | 7/2015 | Green | H02J 7/0042 320/108 |
| 2015/0245126 A1* | 8/2015 | Shaffer | H04R 1/1025 381/74 |
| 2015/0372532 A1 | 12/2015 | Hatanaka et al. | |
| 2017/0005525 A1 | 1/2017 | Lecias et al. | |

FOREIGN PATENT DOCUMENTS

| | | |
|---|---|---|
| JP | 2005-124324 A | 5/2005 |
| JP | 2010-193701 A | 9/2010 |
| JP | 2012-157219 A | 8/2012 |
| JP | 2013-085351 A | 5/2013 |
| JP | 2014-230441 A | 12/2014 |
| JP | 2014-233111 A | 12/2014 |
| WO | WO 2005/122686 A2 | 12/2005 |

* cited by examiner

3 Non-contact Power Transmission Device

FIG. 11

4 Non-contact Power Transmission Device

NON-CONTACT POWER SUPPLY DEVICE AND NON-CONTACT POWER TRANSMISSION DEVICE

TECHNICAL FIELD

The present invention relates to a non-contact power supply device feeding power to a power-feeding object device such as a portable electronic device in a non-contact manner, and a non-contact power transmission device including the same.

BACKGROUND ART

Portable electronic devices including wearable devices such as earphones, headsets, and hearing aids are recently increasingly miniaturized, and power sources are increasingly implemented as secondary batteries. When a power source is a secondary battery, it is conceivable that a method of battery charge includes inserting a connector of a charging cable into a portable electronic device; however, the operation of inserting a connector of a charging cable is cumbersome. If the structure of the connector is made easily insertable, this makes waterproofing difficult. In this regard, battery charge utilizing non-contact power transmission eliminates the cumbersome operation of inserting a connector to the portable electronic device and makes it easy to achieve a waterproof structure. Patent Document 1 discloses an example of applying a non-contact power transmission technique to a hearing aid. In this hearing aid, at least a portion of a power receiving module (such as a power receiving coil) is disposed along a surface shape of any one or more of an outer wall member of a hearing aid body, an outer wall member of an ear mold, and an outer wall member of a coupling portion.

PRIOR ART DOCUMENT

Patent Document

Patent Document 1: Japanese Laid-Open Patent Publication No. 2014-161177

SUMMARY OF THE INVENTION

Problem to be Solved by the Invention

To efficiently transmit power from a power feeding coil of a device to a power receiving coil of a power-feeding object device, the power-feeding object device must be disposed for the non-contact power supply device such that the power receiving coil is located at an appropriate position with respect to a power-feeding coil. No consideration is given to this point in Patent Document 1, and if it is difficult to appropriately dispose the power-feeding object device on the non-contact power supply device, a large burden on a user impairs the convenience, and power transmission may not be performed due to misplacement.

The present invention was conceived in view of the situations and it is therefore an object of the present invention to provide a non-contact power supply device on which a power-feeding object device can easily appropriately be placed, and a non-contact power transmission device including the same.

Means for Solving Problem

An aspect of the present invention is a non-contact power supply device. The non-contact power supply device comprises:

a power feeding coil; and a housing including the power feeding coil, wherein the housing has a concave part capable of at least partially accommodating a power-feeding object device, and the power feeding coil helically turns around the concave part.

The concave part may have a portion with a width narrowing from an opening side toward a bottom side.

The concave part may have a curved surface in at least a portion of an inner surface on which the power-feeding object device is placed.

The inner surface of the concave part may have a portion in which the curvature of the curved surface decreases from the opening side toward the bottom side.

The concave part may have an inner surface shape supporting the power-feeding object device in a posture preventing an axial direction of a power receiving coil of the power-feeding object device and an axial direction of the power feeding coil from orthogonally crossing each other when the power-feeding object device is placed thereon.

The concave part may have an opening width longer than a maximum length of a body part of the power-feeding object device.

A first magnetic body may be provided which cover an outer circumference of the power feeding coil.

A second magnetic body may be provided which is disposed at a position facing a bottom portion of the concave part in the housing, and the second magnetic body has a through-hole in a portion facing a center bottom portion of the concave part.

An auxiliary power feeding coil may be provided which is disposed at a position facing the bottom portion of the concave part in the housing and flatly turning around.

A second magnetic body may be provided on the side of the auxiliary power feeding coil opposite to the bottom portion of the concave part.

The concave part may have a protruding part disposed at the center bottom portion.

The power feeding coil may turn around and spreads outward from the bottom side toward the opening side of the concave part.

Another aspect of the present invention is a non-contact power transmission device. The non-contact power transmission device comprises:

the non-contact power supply device; and a portable electronic device at least partially accommodated in the concave part of the non-contact power supply device, the portable electronic device having a non-contact power receiving component including a secondary battery and a power receiving coil.

The power receiving coil helically may turn around a circumference of the secondary battery.

A third magnetic body may be disposed or extended between the power receiving coil and the outer circumferential surface of the secondary battery.

The third magnetic body may have a box shape having an internal space accommodating the secondary battery.

The third magnetic body may have respective flange parts at both axial end portions of the power receiving coil.

The third magnetic body may have a hollow tubular shape with both ends opened for accommodating the secondary battery therein.

A fourth magnetic body may be provided which covers one opening of the third magnetic body.

A fifth magnetic body may be provided which covers the other opening of the third magnetic body.

The portable electronic device may have a voltage conversion circuit converting an output voltage of the secondary battery, the voltage conversion circuit includes a voltage conversion coil, and a center axis of one of the power receiving coil and the voltage conversion coil is within an inside dimension range of the other.

The voltage conversion coil helically may turn around the circumference of the secondary battery.

A magnetic body may be disposed or extended between the voltage conversion coil and the outer circumferential surface of the secondary battery.

The power receiving coil and the voltage conversion coil may be one and the other of bifilar windings.

It is to be noted that any arbitrary combination of the above-described structural components as well as the expressions according to the present invention changed among a system and so forth are all effective as and encompassed by the present aspects.

Effect of the Invention

The present invention can provide the non-contact power supply device on which a power-feeding object device can easily appropriately be placed, and the non-contact power transmission device including the same.

EMBODIMENT FOR CARRYING OUT THE INVENTION

Now, preferred embodiments of the present invention will be described in detail, referring to the drawings. The same or equivalent constituent elements, members and so on which are shown in the respective drawings are denoted with the same reference numerals, and overlapped descriptions are appropriately omitted. Moreover, the present invention is not limited to the embodiments, but the embodiments are only examples. All features and the combinations of the features which are described in the embodiments are not absolutely essential to the present invention.

First Embodiment

Figure 1:
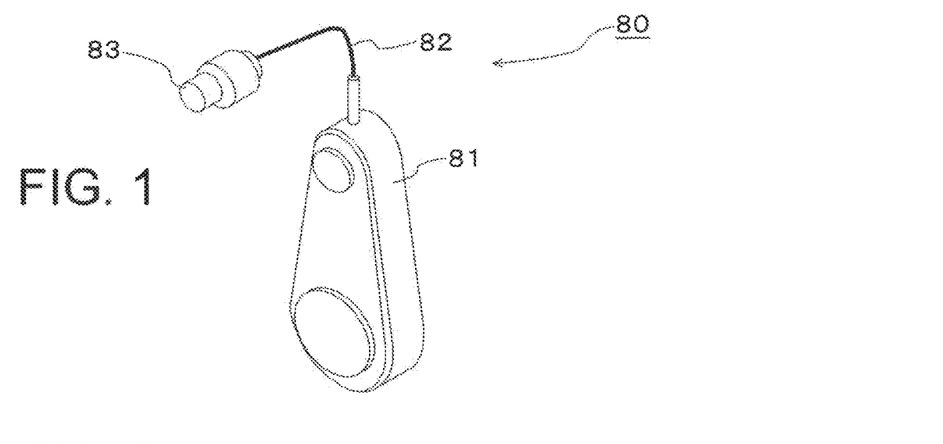
FIG. 1 is a perspective view of a portable electronic device 80 serving as a power-feeding object device in a first embodiment of the present invention.
Figure 2:
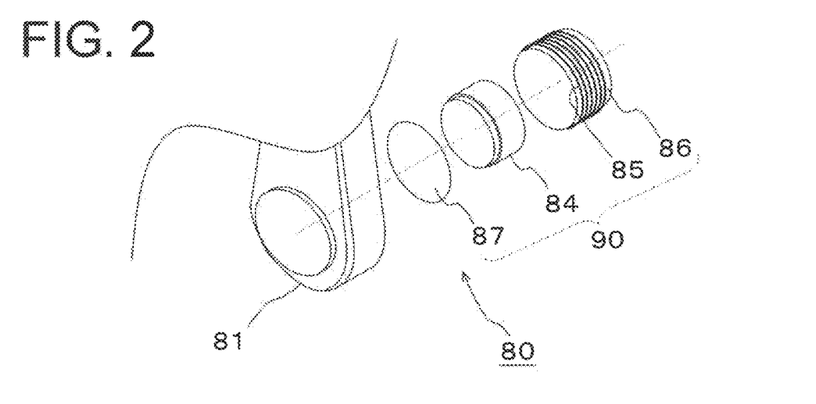
FIG. 2 is an exploded perspective view of a main part of the portable electronic device 80.

A first embodiment of the present invention will be described with reference to FIGS. 1 to 8. As shown in FIG. 1, a portable electronic device 80 is a hearing aid in this embodiment and has an inserting part 83 for the ear at a tip of a cable 82 led out from a housing 81. The housing 81 can be fastened to user's clothes by a locking means such as a clip not shown. The portable electronic device 80 may be of a type hooked to the ear or inserted into the ear. The portable electronic device 80 has a non-contact power receiving component 90 shown in FIG. 3 or 4 and functional components of a microphone not shown etc. inside the housing 81. The non-contact power receiving component 90 shown in FIG. 2 is a schematic exploded perspective view of a first configuration example shown in FIG. 3.

Figure 3:
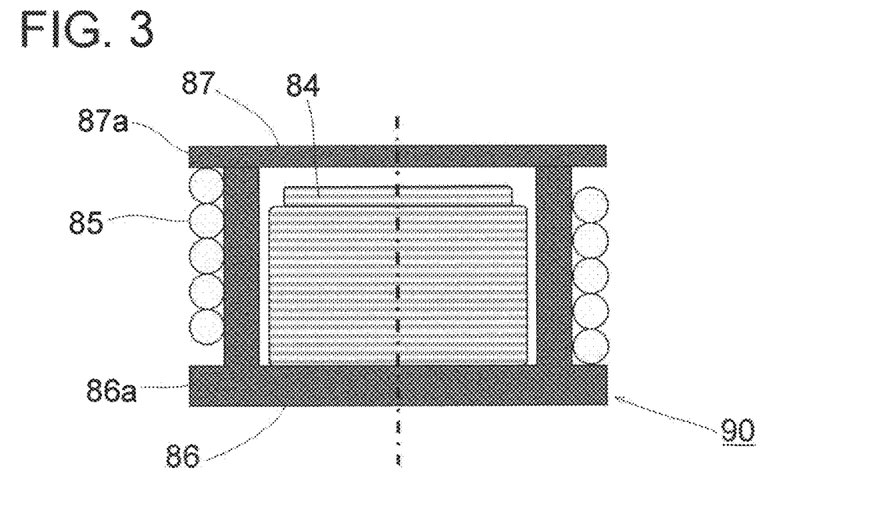
FIG. 3 is a schematic cross-sectional view of a first configuration example of a non-contact power receiving component 90 of the portable electronic device 80.

As shown in FIG. 3, the non-contact power receiving component 90 according to the first configuration example includes a secondary battery 84 such as a lithium ion secondary battery, a power receiving coil 85, a case 86 and a lid 87 serving as a third magnetic body. The case 86 and the lid 87 are sintered bodies of magnetic powder of ferrite, for example. The power receiving coil 85 helically turns around the secondary battery 84. The axial direction of the power receiving coil 85 is parallel to the thickness direction of the housing 81. However, the secondary battery 84 may obliquely be disposed with respect to the thickness direction in the housing 81 so that, in some cases including such a case, the axial direction of the power receiving coil 85 is not parallel to the thickness direction of the housing 81. The case 86 has a box shape having an internal space accommodating the secondary battery 84 and covers a bottom surface and an outer circumferential surface (side surface) of the secondary battery 84. The side surface of the case 86 is interposed between the power receiving coil 85 and the outer circumferential surface of the secondary battery 84. The lid 87 is placed over the case 86 to cover an upper opening of the case 86 (covering an upper surface of the secondary battery 84). The case 86 has a flange part 86a extending outward from the side surface on a bottom surface portion. The lid 87 has a flange part 87a extending outward from the side surface of the case 86. The flange parts 86a, 87a are respectively located at both axial end portions of the power receiving coil 85 and prevent deviation when the power receiving coil 85 is wound around the side surface of the case 86.

Figure 4:
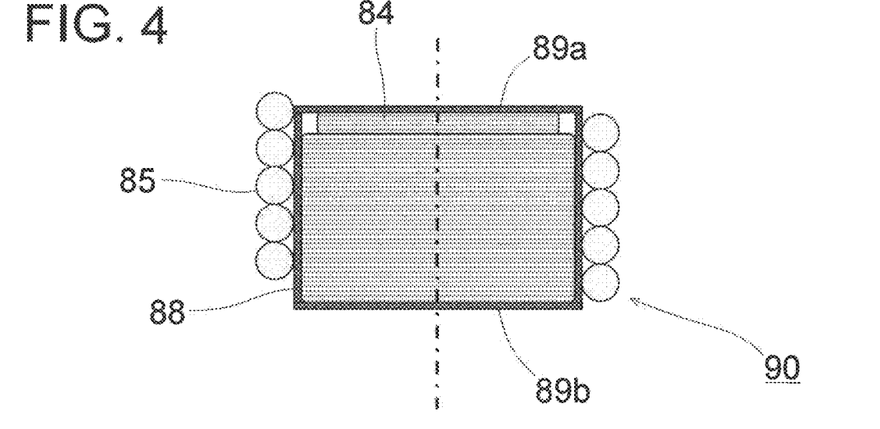
FIG. 4 is a schematic cross-sectional view of a second configuration example of the non-contact power receiving component 90.

As shown in FIG. 4, the non-contact power receiving component 90 according to a second configuration example is different in that the case 86 and the lid 87 shown in FIG. 3 are replaced with flexible magnetic sheets 88, 89a, 89b, and is the same with respect to the other points. The magnetic sheet 88 serving as a third magnetic body has a hollow tubular shape (e.g., a cylindrical shape) with both ends opened for accommodating the secondary battery 84 therein. The magnetic sheet 88 is disposed between the power receiving coil 85 and the outer circumferential surface of the secondary battery 84. The magnetic sheet 89a serving as a fourth magnetic body covers one opening (in this example, an upper opening) of the magnetic sheet 88. The magnetic sheet 89b serving as a fifth magnetic body covers the other opening (in this example, a lower opening) of the magnetic sheet 88.

Figure 5:
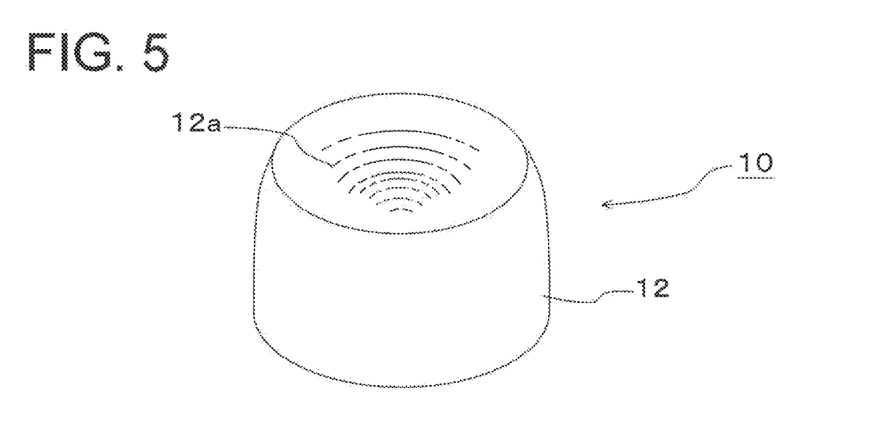
FIG. 5 is a perspective view of a non-contact power supply device 10 in the first embodiment of the present invention.
Figure 6:
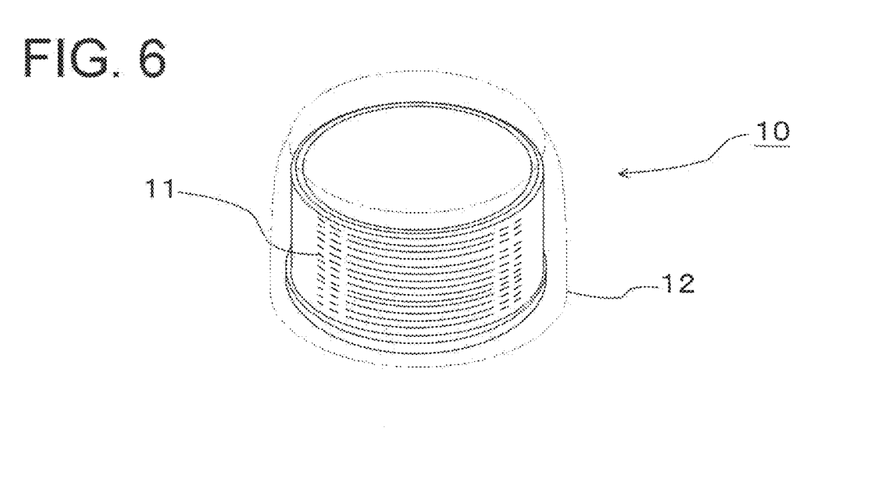
FIG. 6 is a perspective view of the non-contact power supply device 10 seen through a housing 12.
Figure 8:
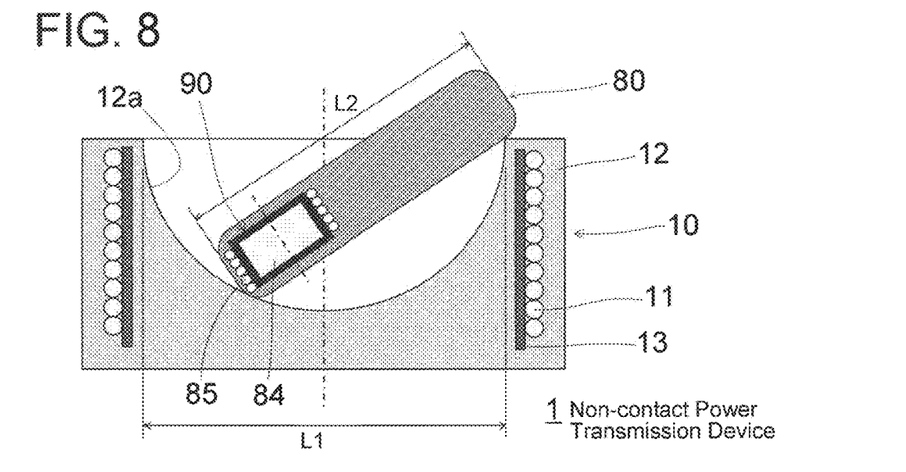
FIG. 8 is a schematic cross-sectional view of the non-contact power transmission device 1.

As shown in FIGS. 5 and 6, the non-contact power supply device 10 includes a power feeding coil (power transmitting coil) 11, a housing 12 including the power feeding coil 11, and a bobbin 13 around which the power feeding coil 11 is wound. The housing 12 is a resin molded body, for example, and has a concave part 12a capable of at least partially accommodating a power-feeding object device. An upper opening and a cross-sectional shape at arbitrary depth of the concave part 12a preferably have a circular shape. The concave part 12a has a curved surface at least in a portion of an inner surface on which the power-feeding object device is placed. In this embodiment, as shown in FIG. 8, the inner surface of the concave part 12a is entirely curved into a spherical shape. The inner surface of the concave part 12a may be curved into an ellipsoidal surface shape or may be curved into a bowl shape other than the spherical surface or the ellipsoidal surface. An inclination angle of the inner surface of the concave part 12a becomes smaller toward a center bottom portion. The curved inner surface of the concave part 12a prevents the power-feeding object device from standing upright (the axial direction of the power receiving coil of the power-feeding object device and the axial direction of the power feeding coil 11 from orthogonally crossing each other). In other words, the concave part 12a has an inner surface shape supporting the power-feeding object device in a posture preventing the axial direction of the power receiving coil of the power-feeding object device and the axial direction of the power feeding coil 11 from orthogonally crossing each other when the power-feeding object device is placed thereon. The bobbin 13 is a cylindrical resin molded body, for example, and is disposed to surround the circumference of the concave part 12a. The power feeding coil 11 is wound around the outer circumferential surface of the bobbin 13 and helically turns around the circumference of the concave part 12a. The bobbin 13 may have respective flange parts at both ends of the power feeding coil 11. Although embedded (integrated) in the housing 12 by insert molding in the example of FIG. 8, the power feeding coil 11 and the bobbin 13 may be held in an internal space of the housing 12 without insert molding.

Figure 7:
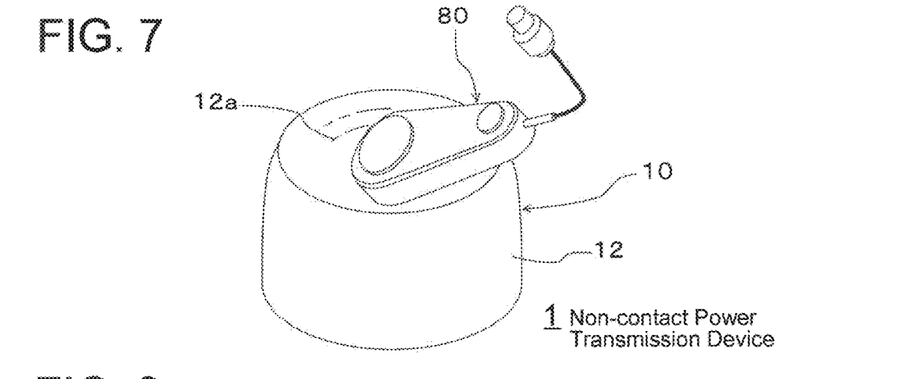
FIG. 7 is a perspective view of a non-contact power transmission device 1 according to the first embodiment of the present invention, showing an example of a state in which the portable electronic device 80 is set on the non-contact power supply device 10.

As shown in FIGS. 7 and 8, the non-contact power transmission device 1 of this embodiment includes the non-contact power supply device 10 and the portable electronic device 80 at least partially accommodated in the concave part 12a of the non-contact power supply device 10. A maximum width (opening width) L1 of the concave part 12a is longer than a maximum length L2 of a body part of the portable electronic device 80. In FIG. 8, an internal configuration of the portable electronic device 80 is not shown except the non-contact power receiving component 90 (the same applies to FIGS. 9 to 16). The posture of the portable electronic device 80 shown in FIGS. 7 and 8 is an example, and the portable electronic device 80 can be charged in various other postures. The portable electronic device 80 can be charged on condition that the axial direction of the power receiving coil 85 of the portable electronic device 80 does not orthogonally cross the axial direction of the power feeding coil 11 of the non-contact power supply device 10, i.e., that portable electronic device 80 does not stand upright on the inner surface of the concave part 12a. In this embodiment, since the inner surface of the concave part 12a is curved, the possibility of the portable electronic device 80 standing upright is extremely small and, when the portable electronic device 80 is placed on the inner surface of the concave part 12a, the portable electronic device 80 becomes stable in a tilted state regardless of placement (at free position) in most cases. When a current flowing through the power feeding coil 11 changes, a magnetic field inside the power feeding coil 11, i.e., a magnetic field in the concave part 12a changes, and an induced voltage is generated in the receiving coil 85. This induced voltage is utilized for charging the secondary battery 84.

According to this embodiment, since the power feeding coil 11 in the non-contact power supply device 10 helically turns around the circumference of the concave part 12a at least partially accommodating the portable electronic device 80, a magnetic field can be generated entirely in the concave part 12a, and if the power receiving coil 85 of the portable electronic device 80 is in the concave part 12a, the portable electronic device 80 can be charged regardless of the placement except a certain case that the axial directions of the power receiving coil 85 and the power feeding coil 11 orthogonally cross each other. Even the orthogonal crossing of the axial directions of the power receiving coil 85 and the power feeding coil 11 can suitably be avoided by devising the inner surface shape of the concave part 12a. Therefore, according to this embodiment, the portable electronic device 80 can easily appropriately be placed (in a chargeable posture) on the non-contact power supply device 10, and a user does not need to pay particular attention to the placement form of the portable electronic device 80 relative to the non-contact power supply device 10, resulting in a smaller burden associated with charging and higher convenience. Additionally, the risk of not being able to transmit power due to misplacement of the portable electronic device 80 relative to the non-contact power supply device 10 can significantly be reduced.

The power receiving coil 85 can be disposed even if a restriction is imposed due to inability to ensure a coil arrangement space above and under the secondary battery 84, and a non-contact power receiving function can be implemented even in the increasingly miniaturized portable electronic device 80. Since the portable electronic device 80 has the non-contact power receiving function, a space for battery exchange (such as a latch for opening and closing a lid) or a space for inserting a cable for charging is no longer necessary, which makes a space available for the arrangement of the power receiving coil 85.

Second Embodiment

Figure 9:
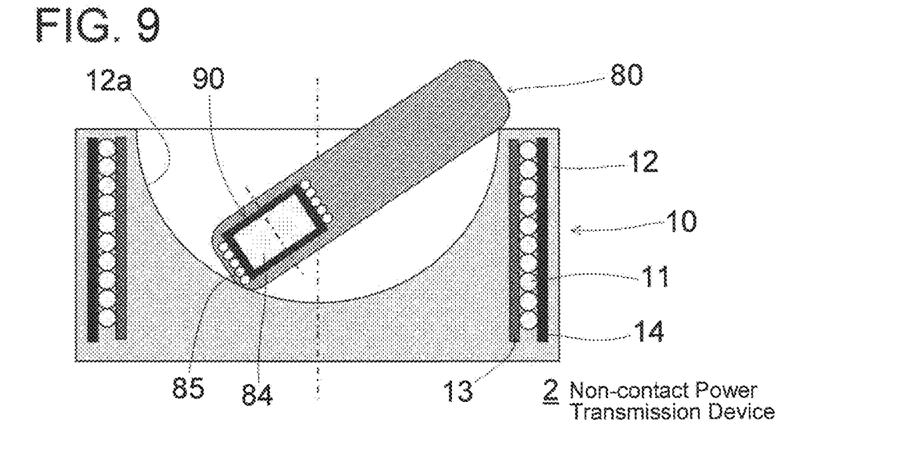
FIG. 9 is a schematic cross-sectional view of a non-contact power transmission device 2 according to a second embodiment of the present invention.

FIG. 9 is a schematic cross-sectional view of a non-contact power transmission device 2 according to a second embodiment of the present invention. This embodiment is different from the first embodiment in that the non-contact power supply device 10 further includes a cylindrical magnetic body 14 as a first magnetic body and is the same with respect to the other points. The cylindrical magnetic body 14 is a ferrite sintered body, for example, and is disposed (held by the housing 12) to closely cover the outer circumference of the power feeding coil 11. According to this embodiment, since the cylindrical magnetic body 14 is disposed, the magnetic field generated inside the power feeding coil 11 can be strengthened so that the power feeding efficiency is enhanced.

Third Embodiment

Figure 10:
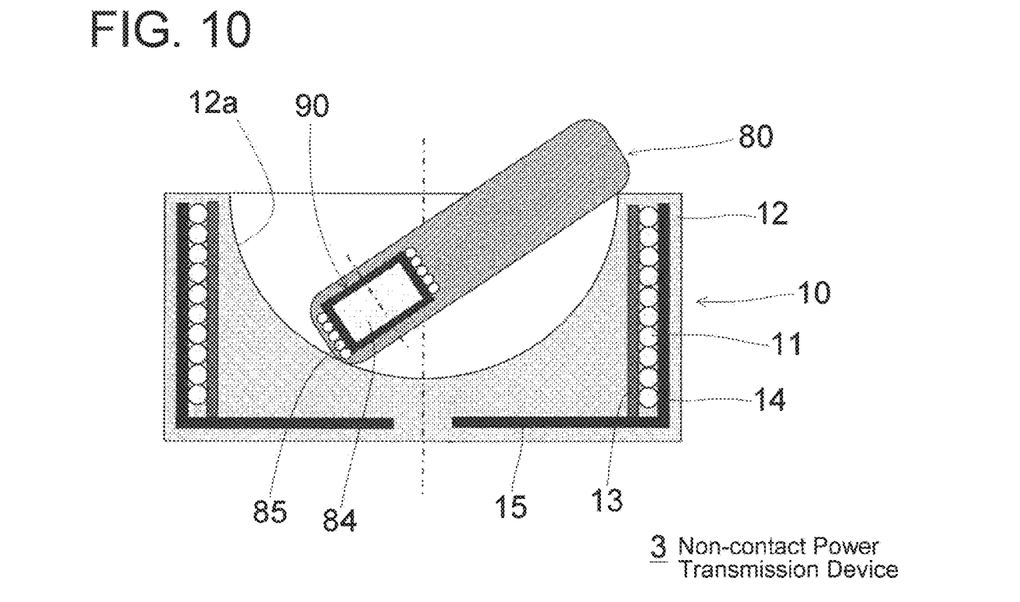
FIG. 10 is a schematic cross-sectional view of a non-contact power transmission device 3 according to a third embodiment of the present invention.

FIG. 10 is a schematic cross-sectional view of a non-contact power transmission device 3 according to a third embodiment of the present invention. This embodiment is different from the second embodiment in that the non-contact power supply device 10 further includes a flat plate-shaped magnetic body 15 as a second magnetic body and is the same with respect to the other points. The flat plate-shaped magnetic body 15 is a ferrite sintered body, for example, and is disposed at a position facing the bottom portion of the concave part 12a in the housing 12 to cover the lower opening of the cylindrical magnetic body 14. The flat plate-shaped magnetic body 15 has a disk shape and has a through-hole in a center portion (a portion facing the center bottom portion of the concave part 12a) to form a donut shape. According to this embodiment, since the flat plate-shaped magnetic body 15 is disposed, the magnetic field can be strengthened near the center bottom portion of the concave part 12a where the magnetic field tends to weaken. The flat magnetic body 15 may be added to the configuration of the first embodiment without adding the cylindrical magnetic body 14.

Fourth Embodiment

Figure 11:
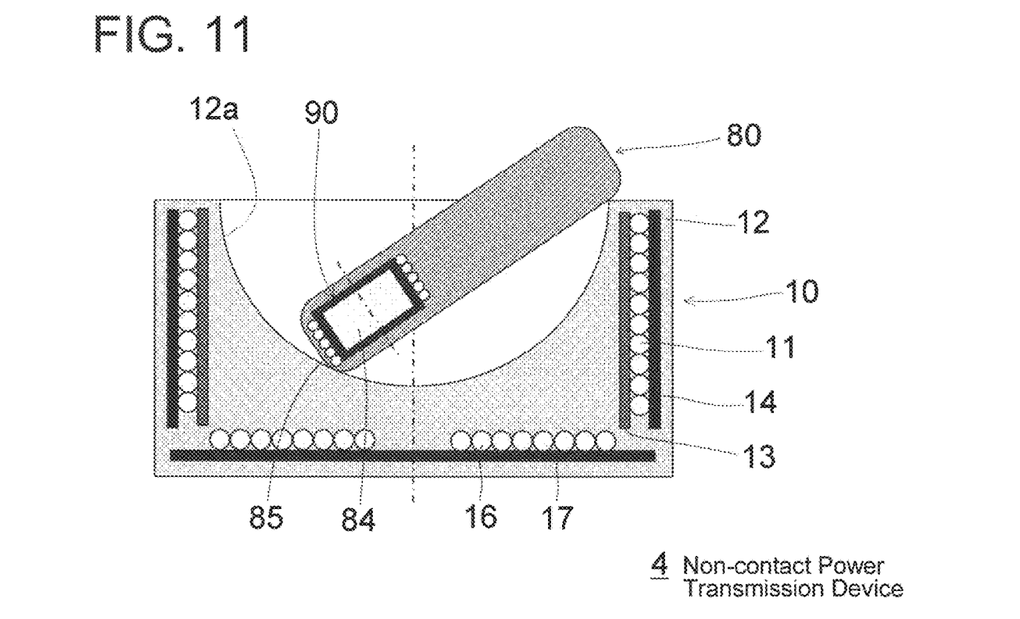
FIG. 11 is a schematic cross-sectional view of a non-contact power transmission device 4 according to a fourth embodiment of the present invention.

FIG. 11 is a schematic cross-sectional view of a non-contact power transmission device 4 according to a fourth embodiment of the present invention. This embodiment is different from the second embodiment in that the non-contact power supply device 10 further includes an auxiliary power feeding coil 16 and a flat plate-shaped magnetic body 17 as the second magnetic body and is the same with respect to the other points. The auxiliary power feeding coil 16 is disposed (held by the housing 12) at a position facing the bottom portion of the concave part 12a in the housing 12 and flatly turns around in a spiral shape. The axis of the auxiliary power feeding coil 16 preferably coincides with the axis of the power feeding coil 11. The center portion of the auxiliary power feeding coil 16 faces the center bottom portion of the concave part 12a. The flat plate-shaped magnetic body 17 is disposed (held by the housing 12) closely to the auxiliary power feeding coil 16 on the side opposite to the bottom portion of the concave part 12a. The flat plate-shaped magnetic body 17 is a disk-shaped ferrite sintered body, for example. According to this embodiment, since the auxiliary power feeding coil 16 is disposed, the magnetic field can be strengthened near the center bottom portion of the concave part 12a where the magnetic field tends to weaken. Additionally, since the flat plate-shaped magnetic body 17 is disposed, the magnetic field generated inside the power feeding coil 11 can be strengthened so that the power feeding efficiency is enhanced. The auxiliary power feeding coil 16 and the flat plate-shaped magnetic body 17 may be added to the configuration of the first embodiment without adding the cylindrical magnetic body 14.

Fifth Embodiment

Figure 12:
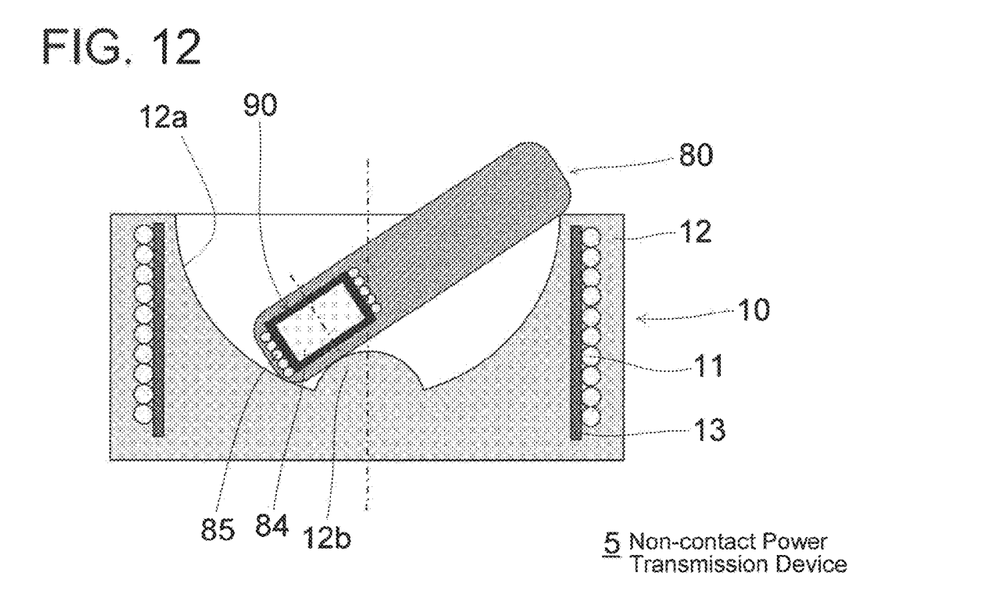
FIG. 12 is a first schematic cross-sectional view of a non-contact power transmission device 5 according to a fifth embodiment of the present invention.
Figure 13:
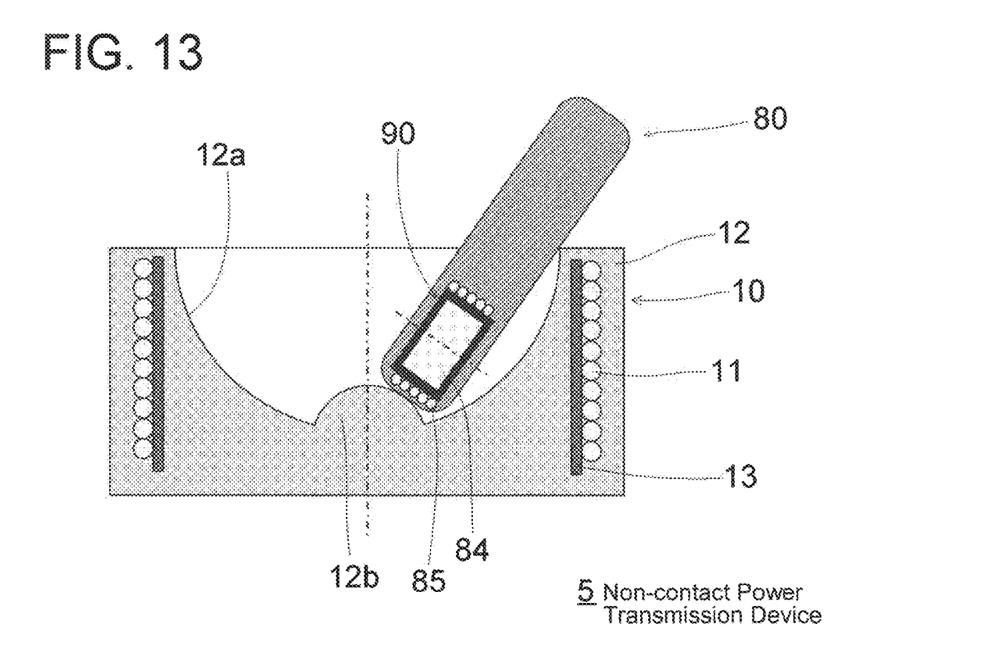
FIG. 13 is a second schematic cross-sectional view of the non-contact power transmission device 5.

FIG. 12 is a first schematic cross-sectional view of a non-contact power transmission device 5 according to a fifth embodiment of the present invention. FIG. 13 is a second schematic cross-sectional view of the non-contact power transmission device 5. This embodiment is different from the first embodiment in that a protruding part (convex part) 12b is disposed at the center bottom portion of the concave part 12a and is the same with respect to the other points. The protruding part 12b prevents the portable electronic device 80 serving as the power-feeding object device from standing upright (the axial direction of the power receiving coil 85 and the axial direction of the power feeding coil 11 from orthogonally crossing each other). The portable electronic device 80 stands upright when the portable electronic device 80 is placed on the center bottom portion of the concave part 12a in an upright posture; however, according to this embodiment, since the protruding part 12b is disposed, the slight possibility of the electronic device 80 standing upright can further be reduced. The protruding part 12b may be added to the configurations of the second to fourth embodiments.

Sixth Embodiment

Figure 14:
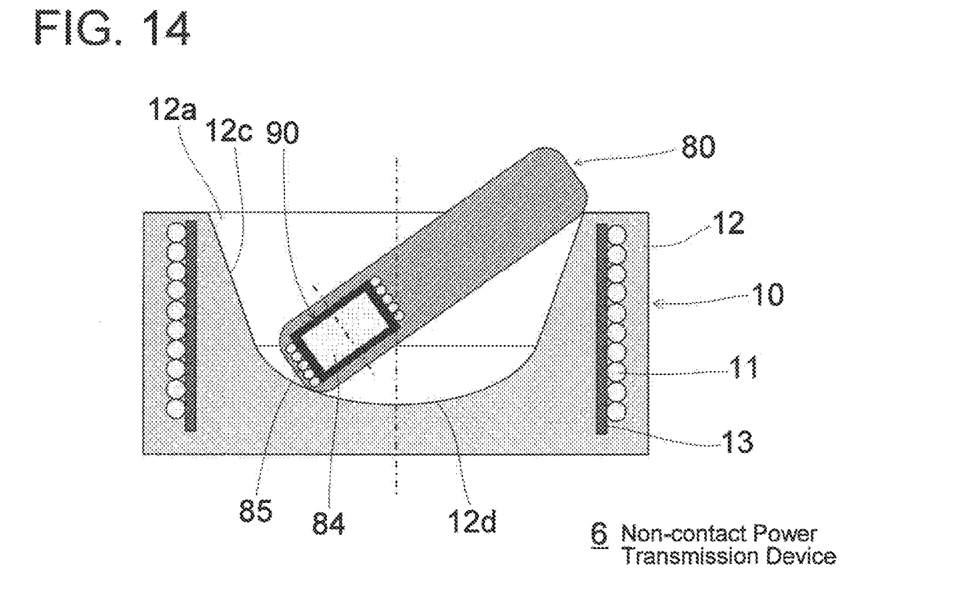
FIG. 14 is a schematic cross-sectional view of a non-contact power transmission device 6 according to a sixth embodiment of the present invention.
Figure 15:
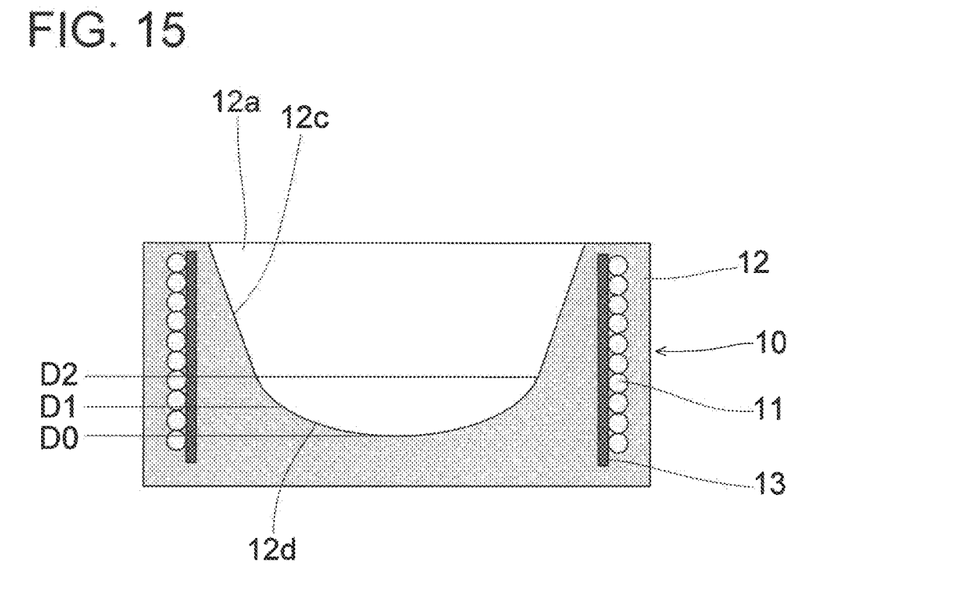
FIG. 15 is a schematic cross-sectional view of the non-contact power supply device 10 of FIG. 14.

FIG. 14 is a schematic cross-sectional view of a non-contact power transmission device 6 according to a sixth embodiment of the present invention. FIG. 15 is a schematic cross-sectional view of the non-contact power supply device 10 of FIG. 14. This embodiment is different from the first embodiment in that the concave part 12a has a first inner surface portion 12c in a truncated-cone side surface shape and a second inner surface portion 12d curved into a bowl shape and is the same with respect to the other points. As shown in FIG. 15, in the second inner surface portion 12d, a curvature in a range from a depth D0 (a deepest portion of the concave part 12a) to a depth D1 is smaller than a curvature in a range from the depth D1 to a depth D2. Therefore, the inner surface of the concave part 12a has a portion in which the curvature decreases from the opening side to the bottom side. The inclination angle of the second inner surface portion 12d is smaller than the inclination angle of the first inner surface portion 12c. The inclination angle of the second inner surface portion 12d becomes smaller toward the center bottom portion. The inner surface shape of the concave part 12a of this embodiment may be applied to the configurations of the second to fifth embodiments.

Seventh Embodiment

Figure 16:
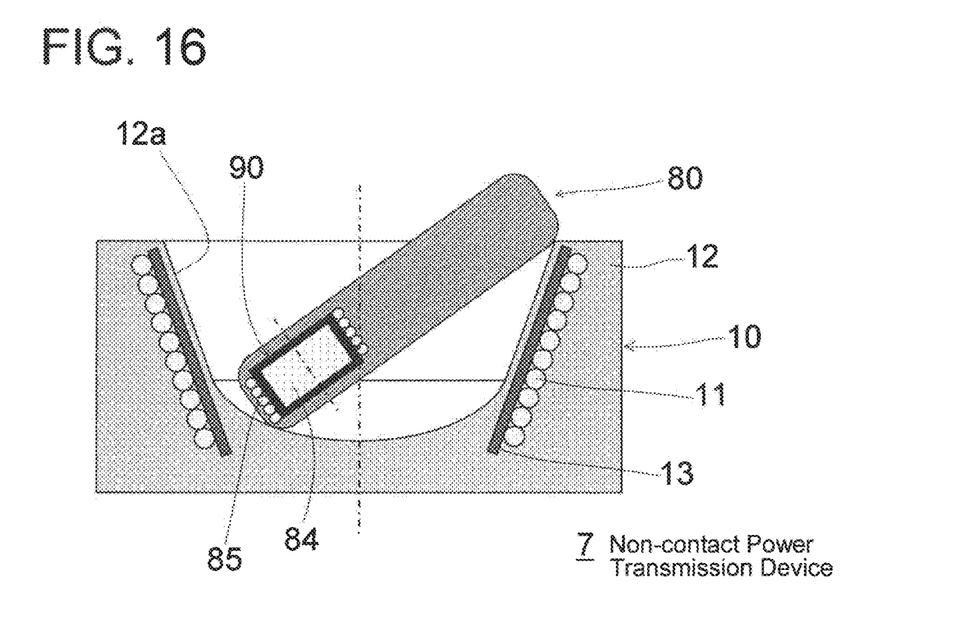
FIG. 16 is a schematic cross-sectional view of a non-contact power transmission device 7 according to a seventh embodiment of the present invention.

FIG. 16 is a schematic cross-sectional view of a non-contact power transmission device 7 according to a seventh embodiment of the present invention. This embodiment is different from the sixth embodiment in that the bobbin 13 has a truncated-cone side surface shape along the first inner surface portion 12c of the concave part 12a and that the power feeding coil 11 turns around and spreads outward from the bottom side toward the opening side of the concave part 12a and is the same with respect to the other points. According to this embodiment, since the power feeding coil 11 turns around and spreads outward from the bottom side toward the opening side of the concave part 12a, the magnetic field can be strengthened near the center bottom portion of the concave part 12a where the magnetic field tends to weaken. The configuration of the power feeding coil 11 turning around and spreading outward from the bottom side toward the opening side of the concave part 12a may be applied to the configurations of the first to fifth embodiments.

Eighth Embodiment

Figure 17:
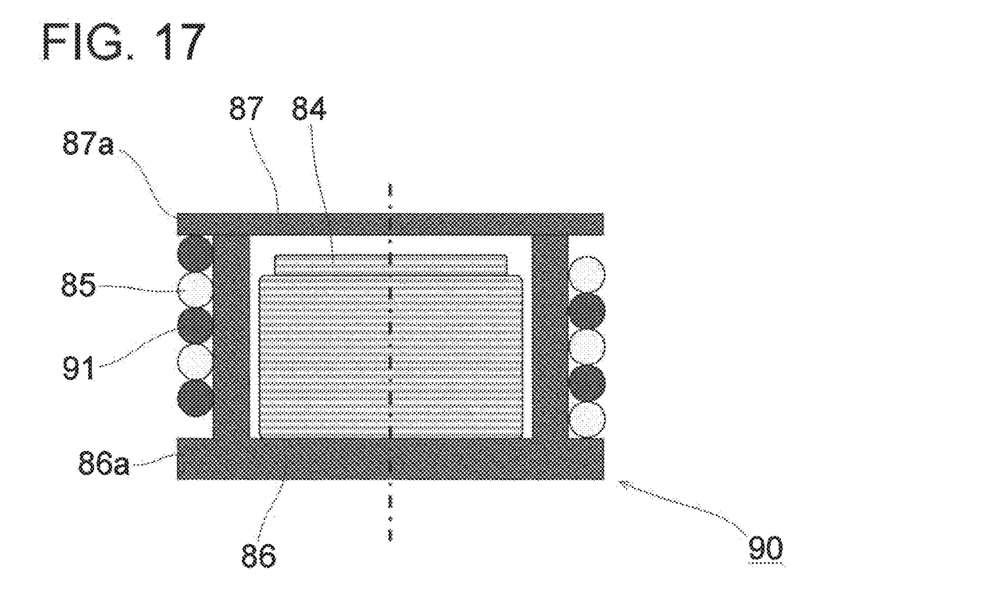
FIG. 17 is a schematic cross-sectional view of a non-contact power receiving component 90 (non-contact power receiving component 90 according to a third configuration example) in an eighth embodiment of the present invention.
Figure 18:
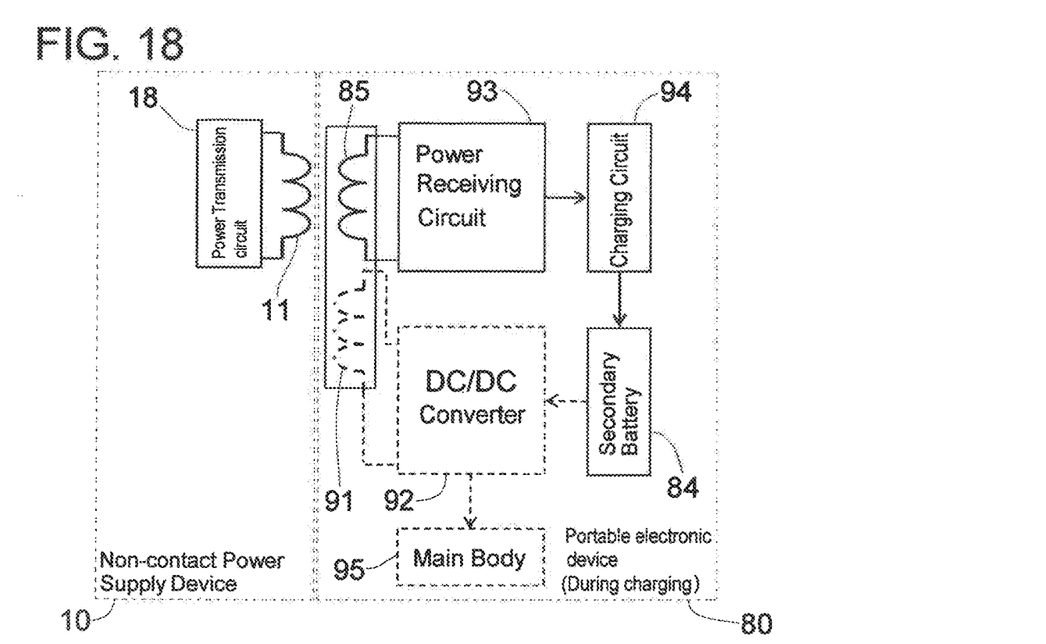
FIG. 18 is a circuit diagram during charging of the portable electronic device 80 of the eighth embodiment.
Figure 19:
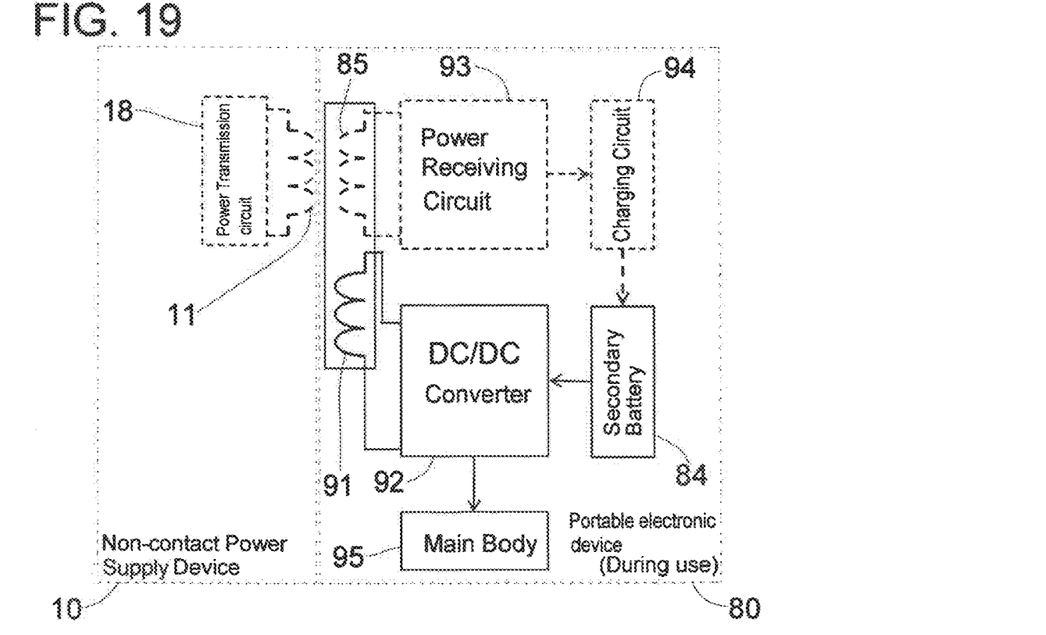
FIG. 19 is a circuit diagram during use of the portable electronic device 80.

FIG. 17 is a schematic cross-sectional view of the non-contact power receiving component 90 (the non-contact power receiving component 90 according to a third configuration example) in an eighth embodiment of the present invention. FIG. 18 is a circuit diagram during charging of the portable electronic device 80 of the eighth embodiment. FIG. 19 is a circuit diagram during use of the portable electronic device 80. FIGS. 18 and 19 show the same circuit as each other; however, in FIG. 18, the circuit blocks inactive during charging of the portable electronic device 80 are indicated by broken lines, and in FIG. 19, the circuit blocks inactive during use of the portable electronic device 80 are indicated by broken lines. In FIGS. 18 and 19, the power receiving coil 85 and a voltage conversion coil 91 are extracted and shown from the blocks of a power receiving circuit 93 and a DC-DC converter 92, respectively.

As shown in FIG. 17, the non-contact power receiving component 90 of this embodiment is different from that of the first embodiment shown in FIG. 3 in that the power receiving coil 85 is one of bifilar windings and is the same with respect to the other points. The other of the bifilar windings is the voltage conversion coil 91. Therefore, in this embodiment, the voltage conversion coil 91 is integrally formed with the power receiving coil 85 (the voltage conversion coil 91 and the power receiving coil 85 are formed as one structure). The voltage conversion coil 91 is a portion of the DC-DC converter 92 serving as a voltage conversion circuit of the portable electronic device 80 shown in FIGS. 18 and 19. A difference in inductance between the power receiving coil 85 and the voltage conversion coil 91 can be dealt with by changing the numbers of turns of both coils.

During charging of the portable electronic device 80, a power transmission circuit 18 of the non-contact power supply device 10 drives the power feeding coil 11, so that the magnetic field is thereby generated and causes an induced voltage to occur in the power receiving coil 85, and the induced voltage allows the power receiving circuit 93 and a charging circuit 94 to supply a charging power to the secondary battery 84. On the other hand, during use of the portable electronic device 80, the DC-DC converter 92 converts the output voltage of the secondary battery 84 into a predetermined voltage for driving a main body 95. The DC-DC converter 92 is a switching power source circuit and utilizes the voltage conversion coil 91 wound coaxially with the power receiving coil 85 as an inductor. According to this embodiment, since the voltage conversion coil 91 helically turns around the circumference of the secondary battery 84 together with the power receiving coil 85, a space is advantageously saved as compared to when an arrangement space of the voltage conversion coil 91 is provided separately from the circumference of the secondary battery 84. Additionally, since the voltage conversion coil 91 and the power receiving coil 85 are formed as one coil unit, the time of coil production can be reduced.

Although the present invention has been described by taking the embodiments as examples, it is understood by those skilled in the art that various modifications can be made to the constituent elements and the processing processes of the embodiments within the scope described in claims. Modification examples will hereinafter be described.

Figure 20:
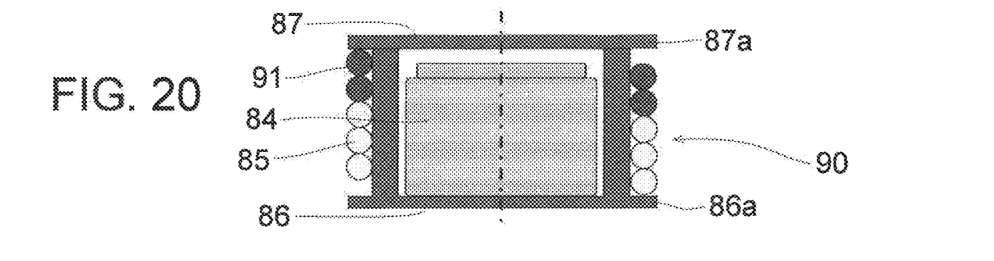
FIG. 20 is a schematic cross-sectional view of a fourth configuration example of the non-contact power receiving component 90.
Figure 21:
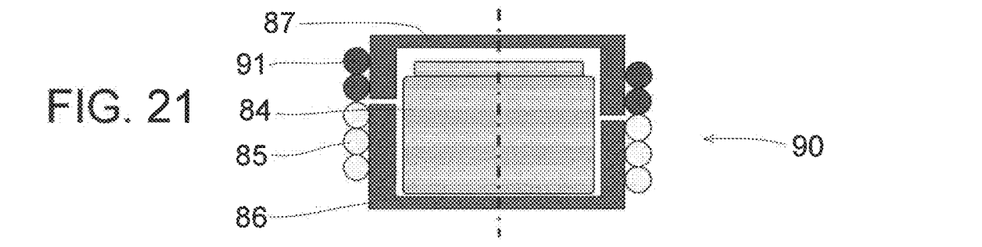
FIG. 21 is a schematic cross-sectional view of a fifth configuration example of the non-contact power receiving component 90.

FIG. 20 is a schematic cross-sectional view of a fourth configuration example of the non-contact power receiving component 90 and shows an example in which the power receiving coil 85 and the voltage conversion coil 91 are wound (helically turned around) coaxially and separately on the upper and lower sides without using bifilar windings in the third configuration example shown in FIG. 17. FIG. 21 is a schematic cross-sectional view of a fifth configuration example of the non-contact power receiving component 90 and shows an example in which the magnetic body inside the power receiving coil 85 and the magnetic body inside the voltage conversion coil 91 are separated in the fourth configuration example shown in FIG. 20. Specifically, the side surface of the case 86 is interposed between the power receiving coil 85 and the secondary battery 84, and the side surface of the lid 87 is interposed between the voltage conversion coil 91 and the secondary battery 84.

Figure 22:
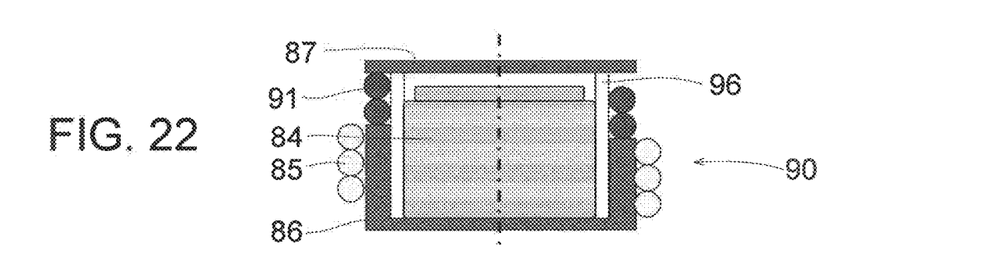
FIG. 22 is a schematic cross-sectional view of a sixth configuration example of the non-contact power receiving component 90.
Figure 23:
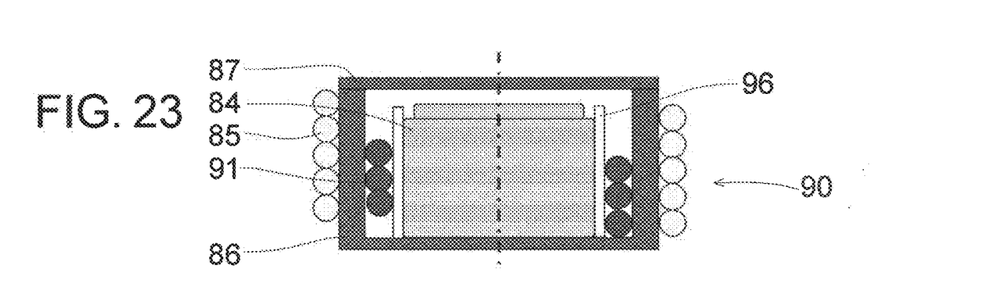
FIG. 23 is a schematic cross-sectional view of a seventh configuration example of the non-contact power receiving component 90.

FIG. 22 is a schematic cross-sectional view of a sixth configuration example of the non-contact power receiving component 90 and shows an example in which no magnetic body is interposed between the voltage conversion coil 91 and the outer circumferential surface of the secondary battery 84 in the fifth configuration example shown in FIG. 21. A cylindrical bobbin 96 is disposed around the secondary battery 84 with the side surface of the case 86 located around the lower portion of the bobbin 96, and the voltage conversion coil 91 is wound around the upper portion of the bobbin 96. FIG. 23 is a schematic cross-sectional view of a seventh configuration example of the non-contact power receiving component 90 and shows an example in which the voltage conversion coil 91 is wound (helically turned) around the circumference of the secondary battery 84 by interposing the bobbin 96, and the power receiving coil 85 is wound (helically turned) around the circumference of the voltage converting coil 91 by interposing the side surface of the case 86.

Figure 24:
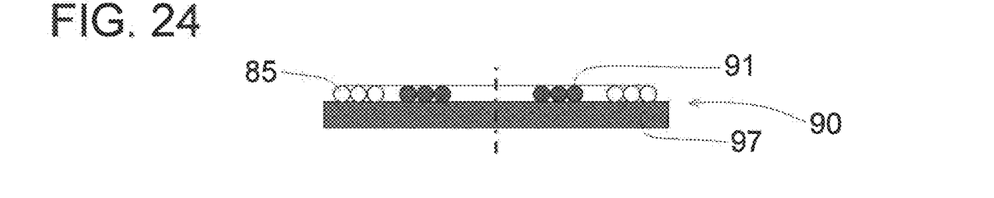
FIG. 24 is a schematic cross-sectional view of an eighth configuration example of the non-contact power receiving component 90.

FIG. 24 is a schematic cross-sectional view of an eighth configuration example of the non-contact power receiving component 90 and shows an example in which the voltage conversion coil 91 and the power receiving coil 85 are each flatly turned around in a spiral shape on a flat plate-shaped magnetic body 97. In this configuration example, the power receiving coil 85 requiring a large inductance is disposed to turn around the outside of the voltage conversion coil 91. This configuration example can be utilized when a space can be ensured either above or below the secondary battery 84. In FIG. 24, the secondary battery 84 is not shown. FIGS. 17 and 20 to 24 illustrate the case that the power receiving coil 85 and the voltage conversion coil 91 are coaxial; however, even though the coils are not coaxial, the axis of one coil may be configured to be within the inside dimension range of the other coil.

In the non-contact power supply device 10, the inner surface of the concave part 12a may be curved into a cylindrical surface shape or an elliptic cylindrical surface shape. In this case, the upper opening and the cross section at arbitrary depth of the concave part 12a may be rectangular or square. Although the bowl-shaped curved surface is superior in terms of freedom of position, even a curved surface having a cylindrical surface shape or an elliptic cylindrical surface shape can produce a certain effect in terms of facilitation of placement of the portable electronic device 80 at the time of charging. In other cases, the inner surface shape of the concave part 12a may be a conical side surface shape or an elliptic conical side surface shape or may be a shape without a curved surface such as a pyramid side surface shape, and the concave part 12a may have, for example, a portion with a width narrowing from the opening side to the bottom side so as to prevent the power-feeding object device from standing upright (the axial direction of the power feeding coil of the power-feeding object device and the axial direction of the power feeding coil 11 from orthogonally crossing each other). The cylindrical magnetic body 14 of the second embodiment (FIG. 9) may be replaced with a magnetic body having a truncated-cone side surface shape, a rectangular tube shape, or a truncated-pyramid side surface shape.

EXPLANATIONS OF LETTERS OR NUMERALS

1 to 7 non-contact power transmission device, 10 non-contact power supply device, 11 power feeding coil (power transmitting coil), 12 housing, 12a concave part, 12b protruding part (convex part), 12c first inner surface portion, 12d second inner surface portion, 13 bobbin, 14 cylindrical magnetic body (first magnetic body), 15 flat plate-shaped magnetic body (second magnetic body), 16 auxiliary power feeding coil, 17 flat plate-shaped magnetic body (second magnetic body), 80 portable electronic device, 81 housing, 82 cable, 83 inserting part, 84 secondary battery, 85 power receiving coil, 86 case, 86a flange part, 87 lid, 87a flange part, 88,89a,89b magnetic sheet (third to fifth magnetic body), 90 non-contact power receiving component, 91 voltage conversion coil, 92 DC-DC converter (voltage conversion circuit), 93 power receiving circuit, 94 charging circuit, 95 main body, 96 bobbin, 97 flat plate-shaped magnetic body

The invention claimed is:

1. A non-contact power supply device comprising:
   a power feeding coil;
   a housing containing the power feeding coil, wherein
      the housing has a concave part capable of at least partially accommodating a power-feeding object device,
      the power feeding coil includes helically wound turns wound around the concave part, and
      the power feeding coil has an outer circumference and further comprises a first magnetic body covering the outer circumference of the power feeding coil; and
   a second magnetic body disposed at a position facing a bottom portion of the concave part of the housing, wherein the second magnetic body has a through-hole in a portion facing a center bottom portion of the concave part.

2. The non-contact power supply device according to claim 1, wherein the concave part has an opening side with an opening, a bottom side with a bottom, and a portion with a width narrowing from the opening side toward the bottom side.

3. The non-contact power supply device according to claim 2, wherein the concave part has an inner surface including a curved surface in at least a portion of the inner surface and on which the power-feeding object device may be placed.

4. The non-contact power supply device according to claim 3, wherein the inner surface of the concave part has a portion in which curvature of the curved surface decreases from the opening side toward the bottom side.

5. The non-contact power supply device according to claim 1, wherein the power feeding coil has an axial direction, the power-feeding object device includes a power receiving coil having an axial direction, and the concave part has an inner surface with a shape for supporting the power-feeding object device in a posture preventing the axial direction of a power receiving coil of the power-feeding object device from orthogonally crossing the axial direction of the power feeding coil when the power-feeding object device is located on the inner surface of the concave part.

6. The non-contact power supply device according claim 1, wherein the power-feeding object device has a body part with a maximum length and the concave part has an opening with a width that is longer than the maximum length of the body part of the power-feeding object device.

7. The non-contact power supply device according to claim 1, wherein the concave part has a bottom portion with a center and a protruding part disposed at the center of the bottom portion.

8. The non-contact power supply device according to 2, wherein the power feeding coil is wound around and spreads outward from the bottom side toward the opening side of the concave part.

9. A non-contact power supply device comprising:
   a power feeding coil;
   a housing containing the power feeding coil, wherein
      the housing has a concave part capable of at least partially accommodating a power-feeding object device, and
      the power feeding coil includes helically wound turns wound around the concave part, and
      the concave part has a bottom portion;
   an auxiliary power feeding coil disposed at a position facing the bottom portion of the concave part of the housing, wherein the auxiliary power feeding coil is planar; and
   a magnetic body on a side of the auxiliary power feeding coil opposite the bottom portion of the concave part.

10. The non-contact power supply device according to claim 9, wherein the concave part has an opening side with an opening, a bottom side with a bottom, and a portion with a width narrowing from the opening side toward the bottom side.

11. The non-contact power supply device according to claim 10, wherein the concave part has an inner surface including a curved surface in at least a portion of the inner surface and on which the power-feeding object device may be placed.

12. The non-contact power supply device according to claim 11, wherein the inner surface of the concave part has a portion in which curvature of the curved surface decreases from the opening side toward the bottom side.

13. The non-contact power supply device according to claim 9, wherein the power feeding coil has an axial direction, the power-feeding object device includes a power receiving coil having an axial direction, and the concave part has an inner surface with a shape for supporting the power-feeding object device in a posture preventing the axial direction of a power receiving coil of the power-feeding object device from orthogonally crossing the axial direction of the power feeding coil when the power-feeding object device is located on the inner surface of the concave part.

14. The non-contact power supply device according claim 9, wherein the power-feeding object device has a body part with a maximum length and the concave part has an opening with a width that is longer than the maximum length of the body part of the power-feeding object device.

15. A non-contact power transmission device comprising:
a non-contact power supply device including
a power feeding coil, and
a housing containing the power feeding coil, wherein
the housing has a concave part, and
the power feeding coil includes helically turns wound around the concave part; and
a portable electronic device at least partially accommodated in the concave part of the non-contact power supply device, wherein the portable electronic device includes
a non-contact power receiving component,
a secondary battery,
a power receiving coil helically wound around an outer circumferential surface of the secondary battery, and
a first magnetic body disposed or extended between the power receiving coil and the outer circumferential surface of the secondary battery.

16. The non-contact power transmission device according to claim 15, wherein the first magnetic body has a box shape having an internal space accommodating the secondary battery.

17. The non-contact power transmission device according to claim 16, wherein the first magnetic body has respective flange parts located at axial end portions of the power receiving coil.

18. The non-contact power transmission device according to claim 15, wherein the first magnetic body has a hollow tubular shape with first and second open ends for accommodating the secondary battery.

19. The non-contact power transmission device according to claim 18, comprising a second magnetic body covering the first open end of the first magnetic body.

20. The non-contact power transmission device according to claim 19, comprising a third magnetic body covering the second open end of the first magnetic body.

21. A non-contact power transmission device comprising:
a non-contact power supply device including
a power feeding coil, and
a housing containing the power feeding coil, wherein
the housing has a concave part, and
the power feeding coil includes helically turns wound around the concave part; and
a portable electronic device at least partially accommodated in the concave part of the non-contact power supply device, wherein the portable electronic device includes
a non-contact power receiving component,
a secondary battery,
a power receiving coil helically wound around an outer circumferential surface of the secondary battery, and
a voltage conversion circuit converting an output voltage of the secondary battery and including a voltage conversion coil, wherein
each of the power receiving coil and the voltage conversion coil has respective windings surrounding a respective central axis of the power receiving coil and the voltage conversion coil, and
the center axis of one of the power receiving coil and the voltage conversion coil is inside the windings of the other of the power receiving coil and the voltage conversion coil.

22. The non-contact power transmission device according to claim 21, wherein the voltage conversion coil is helically wound around the outer circumferential surface of the secondary battery.

23. The non-contact power transmission device according to claim 22, including a magnetic body disposed or extended between the voltage conversion coil and the outer circumferential surface of the secondary battery.

24. The non-contact power transmission device according to claim 21, wherein the power receiving coil and the voltage conversion coil are bifilar windings.

* * * * *